United States Patent [19]
Murakami et al.

[11] Patent Number: 5,325,398
[45] Date of Patent: Jun. 28, 1994

[54] PULSE COUNT MODE COMMUNICATION SYSTEM

[75] Inventors: Azuma Murakami; Hiroki Morii, both of Kitakatsushika, Japan

[73] Assignee: Kabushikikaisha Wacom, Saitama, Japan

[21] Appl. No.: 730,830

[22] PCT Filed: Dec. 11, 1990

[86] PCT No.: PCT/JP90/01613
§ 371 Date: Jul. 24, 1991
§ 102(e) Date: Jul. 24, 1991

[87] PCT Pub. No.: WO91/09362
PCT Pub. Date: Jun. 27, 1991

[30] Foreign Application Priority Data

Dec. 13, 1989 [JP] Japan ................... 1-324328
Nov. 2, 1990 [JP] Japan ................... 2-295372

[51] Int. Cl.⁵ .................... H03K 7/00; H03K 9/00
[52] U.S. Cl. .......................... 375/21; 375/25; 341/30; 341/184; 341/64
[58] Field of Search .............. 375/21, 23, 25; 341/29, 341/30, 63, 64, 184; 178/18, 19

[56] References Cited

U.S. PATENT DOCUMENTS 3,898,647 8/1975 Morra et al. .................... 341/64
4,739,303 4/1988 Kobayashi ..................... 178/18

Primary Examiner—Stephen Chin
Assistant Examiner—Don N. Vo
Attorney, Agent, or Firm—Lowe, Price, LeBlanc & Becker

[57] ABSTRACT

A transmitter pulse circuit produces two-phase pulse trains containing a certain number of pulse edges corresponding to an integral number represented by binary parallel bits of a data value to be transferred. The transmitter responds to a coordinate data value derived from a digitizer. The receiver includes a counter for counting pulse edges contained in the two-phase pulse trains, and a retrieving circuit for retrieving intermittently the counted contents to determine the number of received pulse edges. The counting circuit and the retrieving circuit constitute together a bus mouse interface of a host computer in the receiver. The coordinate data can be transferred to the host computer through the bus mouse interface without using a general RS-232C interface, thereby efficiently improving the host computer multiple terminal processing capacity.

21 Claims, 14 Drawing Sheets

FIG.14
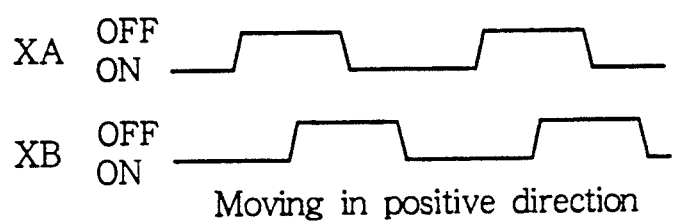
Moving in positive direction
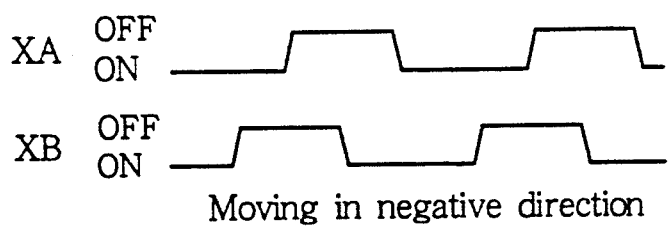
Moving in negative direction dX,dY +127~ −128

PULSE COUNT MODE COMMUNICATION SYSTEM

TECHNICAL FIELD

The present invention generally relates to a communication system for transferring data composed of binary parallel bits from a transmitter to a receiver, and specifically relates to a system for transferring an input data value from a peripheral terminal device to a host computer to process the data. More particularly, the present invention relates to a communication system for transferring a coordinate data value derived from a digitizer operative to effect two-dimensional coordinate designation to a host computer through an interface provided in the host computer.

BACKGROUND TECHNOLOGY

A conventional asynchronous data communication system operating in a start-stop synchronization mode initially converts parallel data bits into serial data bits which are then transferred, i.e. transmitted, from a transmitter to a receiver.

This system is described briefly with respect to an example in which a data value is transferred from a digitizer to a host computer. FIG. 10 is an overall perspective view of a communication system including a digitizer and a host computer. The digitizer 1 is comprised of a tablet planar sensor 2 which defines a two-dimensional coordinate plane. A suitable input tool such as a stylus pen 3 is used to designate a given point on a surface of the tablet planar sensor 2 so that the sensor 2 generates an analog detection signal indicative of the designated point. The digitizer 1 further includes a processing circuit unit operative to calculate data representative of a two-dimensional coordinate value of the designated point according to the analog detection signal. The calculated data are fed to the host computer 5 through a signal cable 4. The host computer 5 is provided with a plurality of different type interfaces for connection with peripheral input and output terminal devices. The interfaces are selected according to a form of the signal to be transferred.

FIG. 11 is a waveform of an output signal transmitted from the digitizer. For example, the digitizer generates a coordinate data value in the form of eight parallel data bits. This eight-bit parallel data value is subjected to parallel/serial conversion to produce an eight-bit serial data signal as shown in FIG. 11. For example, eight parallel data bits represented by 10110101 are converted into a corresponding eight-bit serial data signal represented by 1-0-1-1-0-1-0-1. Such mode of bit data transmission is called an asynchronous system of start-stop synchronization mode as noted before. In order to receive a data signal formed according to the asynchronous system of start-stop synchronization mode, the host computer is typically provided with a particular interface based on an RS-232C standard. Therefore, a peripheral terminal device is generally connected to the host computer through a general purpose RS-232C interface.

The RS-232C interface is normally shared by various kinds of peripheral terminal devices adopted to execute data transfer or transaction according to the asynchronous system of start-stop synchronization mode. However, the RS-232C interface can accept a limited number of peripheral terminal devices to be concurrently accessed by the host computer. Therefore, it is desired to provide a different communication mode for effectively executing data transfer or transaction through other interfaces of the host computer than the RS-232C interface.

The typical host computer is provided with a bus mouse interface specifically designed to be connected to a bus mouse device. A brief description is given herewith for the bus mouse for facilitating understanding of the present invention. A bus mouse is generally utilized as a coordinate input terminal device for a computer. However, the bus mouse can treat only a relative displacement value. Further, since the bus mouse has an overall size considerably greater than a stylus pen used as an input tool of the digitizer, the bus mouse cannot carry out character input and menu selection. On the other hand, the digitizer can treat the absolute coordinate value and input characters. Since the bus mouse has a relatively low price and utilizes a relatively simple interface construction, recently developed computers are generally compatible with a standard bus mouse. FIG. 12 is a schematic diagram of the construction of a typical bus mouse device. The bus mouse is manually moved to derive input computer signals representing the amount of its own displacement. The bus mouse is provided on its bottom portion with a ball member 6 to enable the movement of the body of the bus mouse. A pair of sensors 7 and 8 are disposed in contact with the ball member 6 to detect separately X-axis and Y-axis components of the displacement amount.

FIG. 13 is a schematic illustration for the operation of the bus mouse sensor of FIG. 12. The X-axis sensor 7 has a rotary shaft in contact with the ball member 6. Although not shown in the figure, Y-axis sensor 8 has another rotary shaft disposed orthogonally to the rotary shaft of the X-axis sensor 7, in contact with the ball member 6. As ball 6 rolls due to the displacement of the bus mouse, the rotary shaft of the X-axis sensor 7 is rotated according to the X-axis component of the displacement to produce an output signal having pulse trains XA and XB. Concurrently, the bus mouse outputs a switching signal S1 and S2 indicative of operating state or condition of the bus mouse.

FIG. 14 represents waveforms for output signals of the bus mouse. As shown in the figure, the output signal is composed of two pulse trains. When the bus mouse is displaced in the plus or positive direction in terms of X-axis, pulse train XA has a leading phase with respect to pulse train XB. On the other hand, when the bus mouse is displaced in the minus or negative direction in terms of X-axis, the pulse train XA has a lagging phase with respect to pulse train XB. By such operation, the amount of bus mouse displacement per unit time is detected in terms of a number of pulse edges per unit time contained in the output signal; the displacement direction is indicated by the relative phase condition of the output signal.

The typical host computer is provided with a bus mouse interface responsive to the output and switching signals from a bus mouse device. The bus mouse interface contains first and second eight-bit counters respectively corresponding to the X and Y coordinates for counting pulse edges of the X and Y output signals. These calculation results are retrieved from the respective eight-bit counters each period of a given interval of, e.g., 8 ms, regulated by an internal time in the host computer to detect the amount of bus mouse displacement and the switch condition of the bus mouse every period.

As shown in FIG. 11, a conventional digitizer produces an output signal composed of a binary bit series according to the asynchronous system of start-stop synchronization mode. On the other hand, as shown in FIG. 14, the bus mouse device produces an output signal composed of a two-phase pulse train. Therefore, the conventional digitizer has a different output signal format from that of the bus mouse device. Hence the digitizer cannot be directly connected to the bus mouse interface of the host computer.

As understood from the above description, the binary bit serial data value cannot be supplied to the bus mouse interface of the host computer, if it is based on the asynchronous system of start-stop synchronization mode. However, the bus mouse interface is so specialized and therefore is not as frequently occupied as the general RS-232C interface. Thus, it is desired in commercial use to carry out the data transfer or transactions by using a channel of the bus mouse interface. However, the conventional data communication system could not satisfy such a demand in the market.

In view of the above noted drawbacks of the conventional data communication system, an object of the present invention is to provide a new communication system for transferring parallel data bits from a transmitter, such as a peripheral terminal device, to a receiver, such as a host computer, through a bus mouse interface provided in the host computer.

DISCLOSURE OF THE INVENTION

In the inventive communication system for transferring serial data of binary bits from a transmitter to a receiver, the transmitter is provided with a pulse circuit which operates each transfer period of a given interval to output a two-phase pulse train containing a certain number of pulse edges according to an integral value represented by the binary bits to be transferred. This transmitter transmits, for example, a two-dimensional coordinate data value inputted from a digitizer. On the other hand, the receiver is provided with a counting circuit for counting a number of pulse edges contained in the two-phase pulse train, and a retrieving circuit operative each transfer period for intermittently retrieving and resetting a constant of the counting circuit at a given sampling interval and being operative when the newest retrieved content becomes null for summing up all of the successively retrieved contents to thereby determine the number of received pulse edges within each transfer period. The counting and retrieving circuits constitute a bus mouse interface in the receiver.

According to the inventive pulse count mode communication system, the data value is transferred to the host computer through the bus mouse interface instead of the RS-232C interface, in contrast to the prior art. Therefore, multiplex terminal processing capacity of the host computer can be efficiently utilized to a greater extent and the specialized bus mouse interface can be extensively utilized compared to the prior art.

In a preferred form, the transmitter includes a coding circuit for applying to each data value either a plus or minus code to discriminate a sequence of plural data values from each other. The pulse circuit operates according to the applied code to switch a phase condition of the two-phase pulse train. On the other hand, the receiver operates according to the phase switching of the two-phase pulse train to discriminate from each other the time-sequentially transferred plural data values. The coding circuit applies, for example, the plus and minus codes alternately to the sequence of the plural data values. Otherwise, the coding circuit applies the other code to the remaining subsequent data values. By such coding, data transaction errors can be effectively avoided.

In another preferred form, the transmitter includes a pair of the pulse circuits for concurrently transmitting a pair of data values, and the receiver includes a pair of corresponding counting circuits for concurrently receiving the pair of data values. The pair of pulse circuits operate, for example, to transmit a packet of four data values each transaction process by outputting a pair of data values during a first transfer period and outputting another pair of data values during a second transfer period, thereby improving data transaction rate.

In a further preferred form, the receiver includes a selecting circuit operative to select either an absolute coordinate data value or a relative coordinate data value obtained from a coordinate input device, such as a digitizer, in order to selectively transfer one or the other of the absolute and received data values. When the relative coordinate data value is selected, the retrieving circuit of the receiver operates during retrieving periods that are shorter than the data transfer periods for detecting each relative coordinate data value derived from the transmitter every transfer period. The relative coordinate data value is applied with either a positive or a negative sign by the coding circuit, and thereafter is transmitted as a two-phase pulse train by the pulse circuit in a manner similar to the transfer of the bus mouse displacement data value. According to the inventive communication system, a coordinate input device can selectively or switchably transfer either the absolute or relative coordinate data value to a host computer through the bus mouse interface without using the serial RS-232C interface as opposed to the prior art. Therefore, the general purpose serial interface can be assigned to other peripheral devices according to their priority. The bus mouse interface conventionally kept specific to the bus mouse device can be efficiently utilized as a common interface for the coordinate input device. In addition, the host computer can operate an application program designed for the conventional bus mouse.

BRIEF DESCRIPTION OF THE DRAWINGS

FIG. 14 is a waveform diagram of a bus mouse output signal;

THE BEST MODES FOR PRACTICING THE INVENTION

Figure 1:
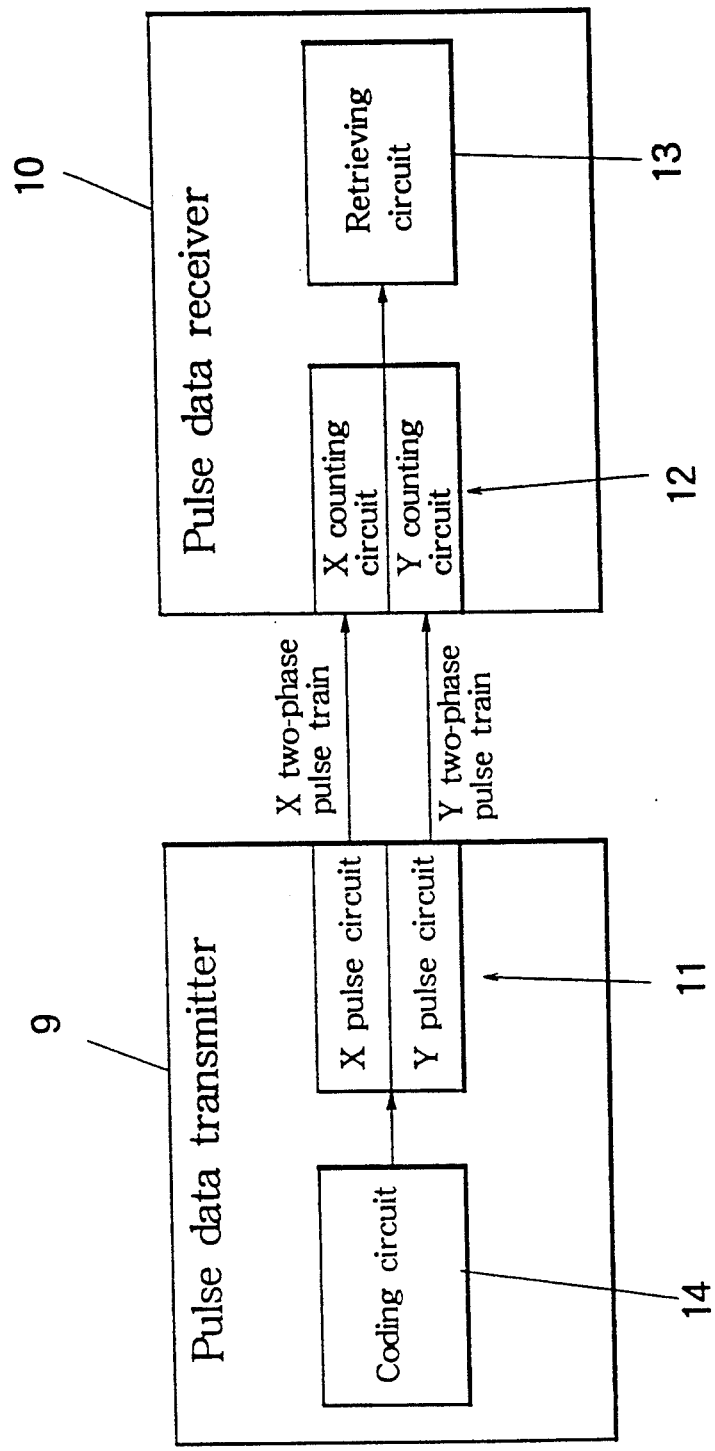
FIG. 1 is an overall structural diagram of the inventive pulse count mode communication system.

FIG. 1 is a block diagram of an overall structure of the pulse edge count mode communication system according to the invention. The communication system is comprised of a pulse data transmitter 9 and a pulse data receiver 10. The transmitter 9 is provided with a pulse circuit 11 operative every transfer period of a given interval to output a two-phase pulse train containing a certain number of pulse edges having an integral value represented by serial binary bits which form a data value to be transferred.

Receiver 10 is provided with a resettable counting circuit 12 for counting successive pulse edges contained in the two-phase pulse train, and a retrieving circuit 13 operative each sampling time within one transfer period for successively retrieving and resetting the content of the counting circuit 12 and being operative when the newest retrieved content becomes null for summing up all of the retrieved contents to determine the number of pulse edges supplied to the receiver. Namely, the counting circuit 12 and the retrieving circuit 13 constitute a bus mouse interface in the pulse data receiver 10.

Preferably, the transmitter 9 includes a coding circuit 14 for selectively applying to each of a plurality of sequential data values a plus and minus code in order to discriminate the plural data value from each other. The pulse circuit 11 operates according to the applied code to select a phase condition of the two-phase pulse train. In addition, the pulse data receiver 10 operates according to the phase condition to discriminate the transferred sequential plural data values from each other. The coding circuit 14 operates, for example, to apply alternately positive and negative codes to a sequence of the plural data values to discriminate preceding and succeeding codes from each other. Otherwise, the coding circuit 14 may apply one code to the first of the sequential data values and may apply another code to the remaining subsequent data values so that the receiver can detect the transmission starting time of a packet transaction of multiple data values.

In a preferred form, the pulse circuit 11 comprises an X pulse circuit and a Y pulse circuit so as to transmit a pair of data values concurrently. Correspondingly, the counting circuit 12 is comprised of an X counting circuit and a Y counting circuit so as to concurrently receive the pair of data values. Moreover, the X and Y pulse circuits operate in a first transfer period to transmit a first pair of data values and operate in a second transfer period to transmit a second pair of data values to transfer a four data packet by processing one transaction. Such communication mode is most suitable for transferring a packet of data values indicative of a coordinate point inputted from a digitizer.

In one aspect of the present invention, a communication system utilizes a bus mouse interface for a transaction involving a packet of four data values during one transaction processing step. The transmitter outputs each data value in the form of a two-phase pulse train. On the other hand, the receiver, such as a host computer, is provided with a bus mouse interface having the following functions:

1. count a number of pulse edges contained in the two-phase pulse train;
2. detect whether the phase of the two-phase pulse train is advancing or receding to recognize plus or minus data values; and
3. concurrently count pulse edges contained in a pair of two-phase pulse trains. The above listed three functions are executed by specific hardware, i.e., a mouse counter provided in the receiver. The receiver converts the received two-phase pulse train into an eight-bit binary complement representation of a decimal data value representing numbers from "−128" through "+127". The transmitter transmits each data value as a two-phase pulse train to the receiver by using the above noted three receiver functions.

Figure 2:
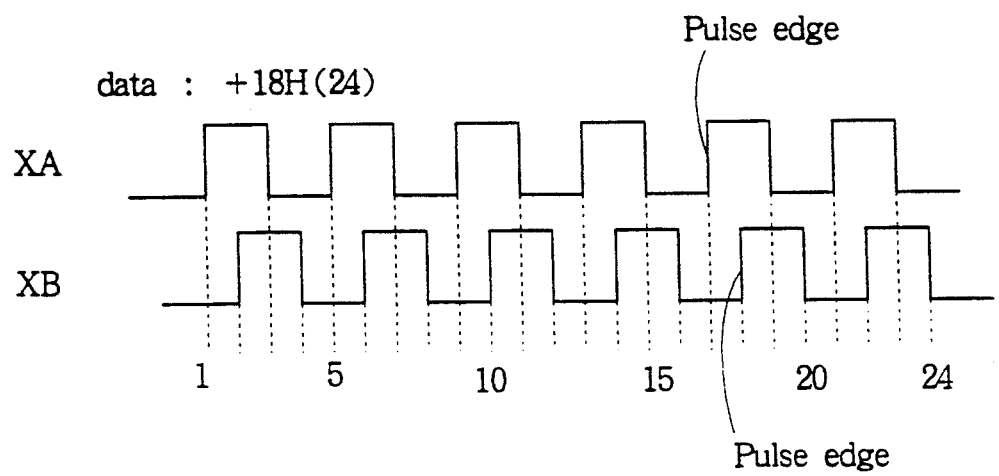
FIG. 2 is a waveform diagram of a two-phase pulse train.

If one data value includes seven binary parallel bits, the data value may represent an integral value of "0" through "127". In such case, the transmitter outputs the data value in the form of a two-phase pulse train containing a corresponding number of pulse edges from 0 to 127 For example, as shown in FIG. 2, if the original data value is 18H, the corresponding binary parallel bits represent the integer "24" so that the produced two-phase pulse train contains 24 pulse edges. The two-phase pulse train is comprised of two phase components XA and XB. The phase relation between the two components is determined according to a code applied with the data. For example, if the data value is applied with the plus code, the phase component XA is advanced relative to the phase component XB. On the other hand, if the data value is applied with the minus code, the phase component XA is delayed relative to the other phase component XB. The term "pulse edge" indicates leading and trailing edges of a pulse contained in the two-phase pulse train; the number of pulse edges is determined by counting all of the pulse edges contained in the two-phase pulse train. The receiver counting circuit, i.e., the mouse counter, counts pulse edges one by one to accumulate calculated results in its register. The receiver retrieving circuit, e.g., CPU, reads out mouse counter content to obtain the data value 18H fed from the transmitter. The CPU resets or clears the mouse counter after reading out the counted content.

If the CPU fails to timely retrieve the counted value from the mouse counter, the counter might overflow during the course of continuous feeding of the two-phase pulse trains. For example, if the transmitter transmitted the next data value as the value 5 after the transmitter had transmitted a previous data value of FF while the receiver failed to retrieve the mouse counter content, the mouse counter would overflow such that its content were incorrectly set to the data value 04. As understood from the above description, the data value outputted from the transmitter would not be correctly received by the receiver. In view of this, the retrieving timing of the mouse counter in the receiver should be regulated according to the output timing of the two-phase pulse train in the transmitter. According to the inventive pulse count communication system, a specific data transfer mode is adopted as shown in FIG. 3 so as to avoid overflow of the mouse counter.

Figure 3:
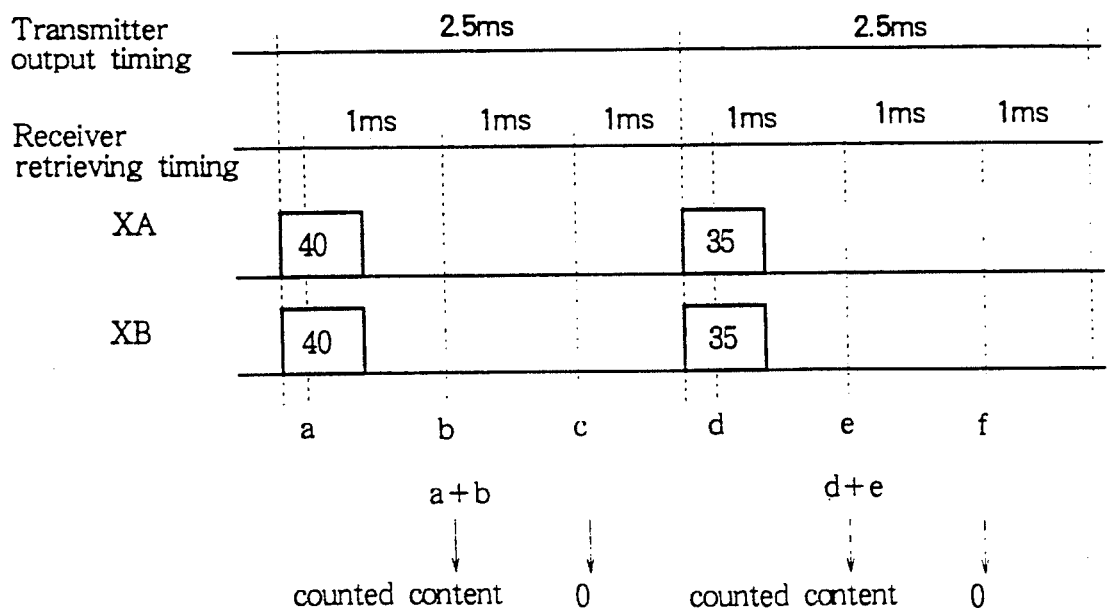
FIG. 3 is a data transaction timing chart.

Referring to the data transaction timing chart of FIG. 3, the transmitter operates during each given 2.5 ms. transfer period to output a two-phase pulse train (XA, XB) containing a certain number of pulse edges corresponding to an integral value represented by the data value to be transferred. The receiver operates during every sampling interval which is set smaller than the each transfer period (for example, 1 ms) for intermittently retrieving the content of the mouse counter. The mouse counter is read out and reset successively while the two-phase pulse train is being derived to avoid mouse counter overflow as well as to recognize an output stop state of the two-phase pulse train to thereby separate multiple data value sequences from each other. In the FIG. 3 timing chart, two data values indicative of integral values "40" and "35" are sequentially transferred from the transmitter to the receiver. When the transmitter starts to output a two-phase pulse train containing 40 pulse edges so as to transfer the first data, the CPU of the receiver operates at time a to read out the mouse counter. At time a, the CPU retrieves a fragmented content "15" indicative of an intermediate number of the pulse edges already outputted during time a. The mouse counter is reset at time a, while it continues to count pulse edges. At the next time b, the mouse counter is again read out or sampled to retrieve another fragmented content of "25" which represents the remaining number of the outputted pulse edges. The receiver operates to sum up the calculated contents retrieved twice to determine the total number of the pulse edges received within one transfer period. At a subsequent time c, the CPU of the receiver again reads the mouse counter content in the same manner. However, since the output of the pulse train has been finished and the mouse counter was reset at the previous sample time b, the last retrieved content is null. The receiver recognizes that the first data value transfer has been finished when the last null content is retrieved from the mouse counter; the receiver determines that the summed value of "15+25=40" is a decimal integer representation of the transferred data value.

Subsequently during a second transfer period, there number of pulse edges corresponding to the integral value "35" represented by the second data value to be transferred. In this second period, the receiver successively reads the mouse counter content at sampling times d, e and f to thereby count and determine the transmitted pulse edge number in the same manner.

Next, the description is given for a data transaction mode for transferring a packet of four data values during one transaction processing interval by using the continuous data transfer system described in conjunction with FIG. 3. In this mode, the X and Y mouse counters are used to concurrently transfer a pair of data. By the first transaction process, a first pair of data values are transferred within a first transfer period, and a second pair of data values are then transferred within a second transfer period, thereby effecting transaction of a packet of four data values.

Since the four data values are treated in one transaction processing operation, the receiver has to separately recognize individual data values. Namely, the receiver has to determine whether a pair of X and Y data values are transmitted during the first period or the second period. The data values are applied with a plus or minus code in order to discriminate between the first and second periods. Namely, the plus and minus codes are alternately applied to the X data value of the concurrently transferred X and Y data values during each transfer period. The selective application of the plus and minus codes is effected by switching the phase condition of the corresponding two-phase pulse train. Hence, the receiver detects the phase condition to determine whether the admitted data value is coded plus or minus. If plus, the admitted data pair is of the first period. On the other hand, if minus, the admitted data pair is of the second period, thereby discriminating four individual data from each other.

In order to ensure the above noted discrimination, the X data value is coded minus once in the one transaction processing. If the X data value has a zero value incidentally when the minus code is to be applied to that data value, the receiver cannot recognize whether that data value is associated with the first one or the second one. In view of this, when a zero data bit is outputted incidentally at a time of the minus coding, the transmitter outputs that zero data value in the form of a negative integer "−128". The receiver operates when the data value is admitted in the form of "−128" to recognize that the admitted data value actually represents a zero value. By the above noted communication mode, a packet of the four data values can be communicated during one transaction processing.

Figure 4:
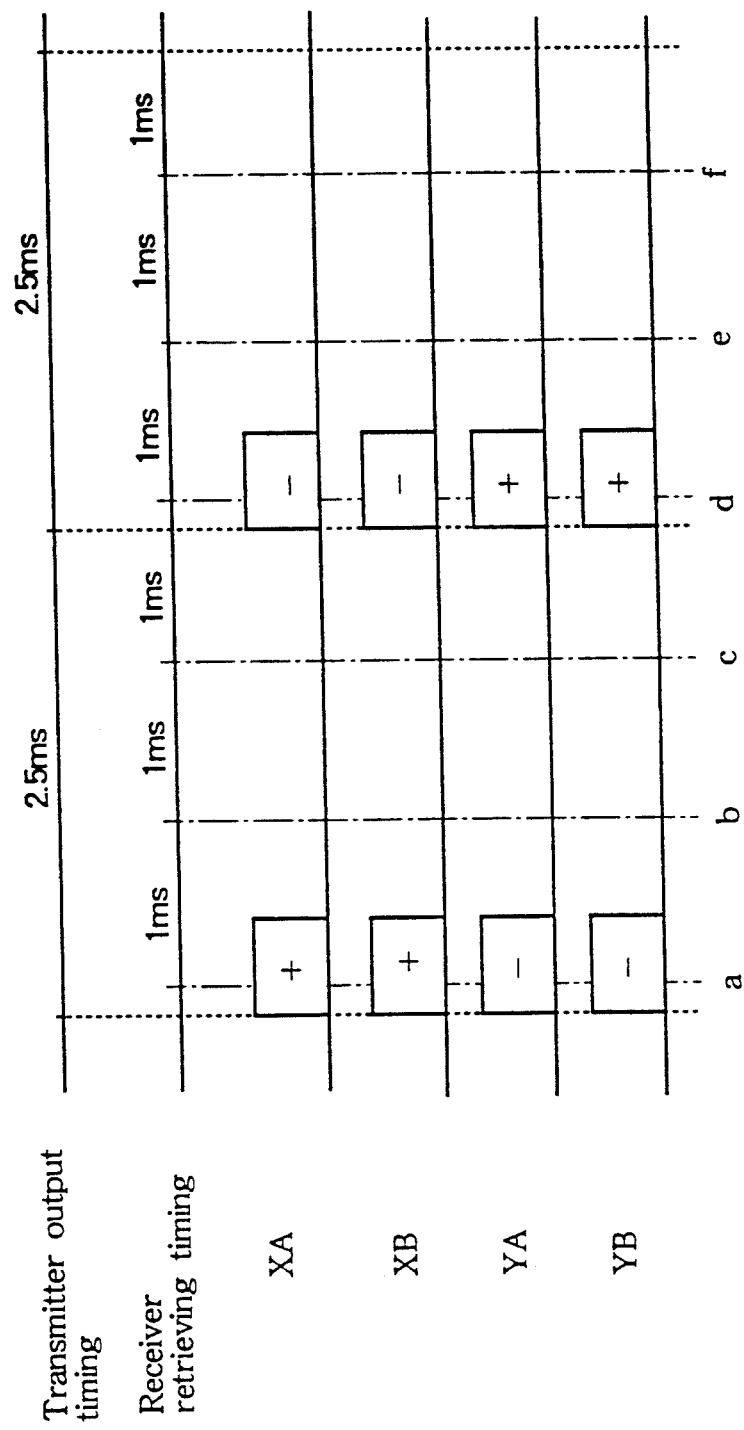
FIG. 4 is another data transaction timing chart.

Further, there is proposed another transfer mode as shown in FIG. 4 in order to improve reliability of the data detection and recognition in the receiver. Namely, the transmitter operates during the first transfer period to apply a plus code to the X data value and to apply a minus code to the Y data value for the first data pair. In turn, the transmitter operates during the second transfer period to apply reversely a minus code to the X data value and to apply a plus code to the Y data value. On the other hand, the receiver recognizes that the four admitted data values are normal and complete when the precedingly admitted X data value is positive and the corresponding Y data value is negative and when the succeedingly admitted X data value is negative and the corresponding Y data value is positive. The receiver judges if the four admitted data values are otherwise erroneous. By such operation, the transferred packet of four data values can be regularly checked as to completeness.

The inventive communication system is not limited to the above described case where a packet of four data values is transferred by one transaction proceeding; the inventive system may also be applied to another case where a packet of eight data values is transferred during one transaction processing, as indicated by the following TABLE 1.

TABLE 1

| X DATA | + 0 − 0 + 0 − 0 + 0 − |
|---|---|
| Y DATA | − 0 + 0 + 0 + 0 − 0 + |

In the above example, a pair of X and Y pulse circuits successively transmit a pair of X and Y data values. The plus or minus code is alternately switched every other transfer period with respect to the X data value to discriminate adjacent data pairs from each other. On the other hand, the first or top Y data value of one transaction packet is applied with a negative code and the remaining or subsequent Y data value in the same data packet are applied with the positive code. The receiver recognizes that a particular Y data value is the top value in one packet when that Y data value is coded negative. By such manner, the transmitter and the receiver cooperate in synchronization with each other to transfer multiple data values. In addition, check sum operation or CRC operation may be effected for the last end data value in one data packet to check the reliability of the transferred data value.

Figure 5:
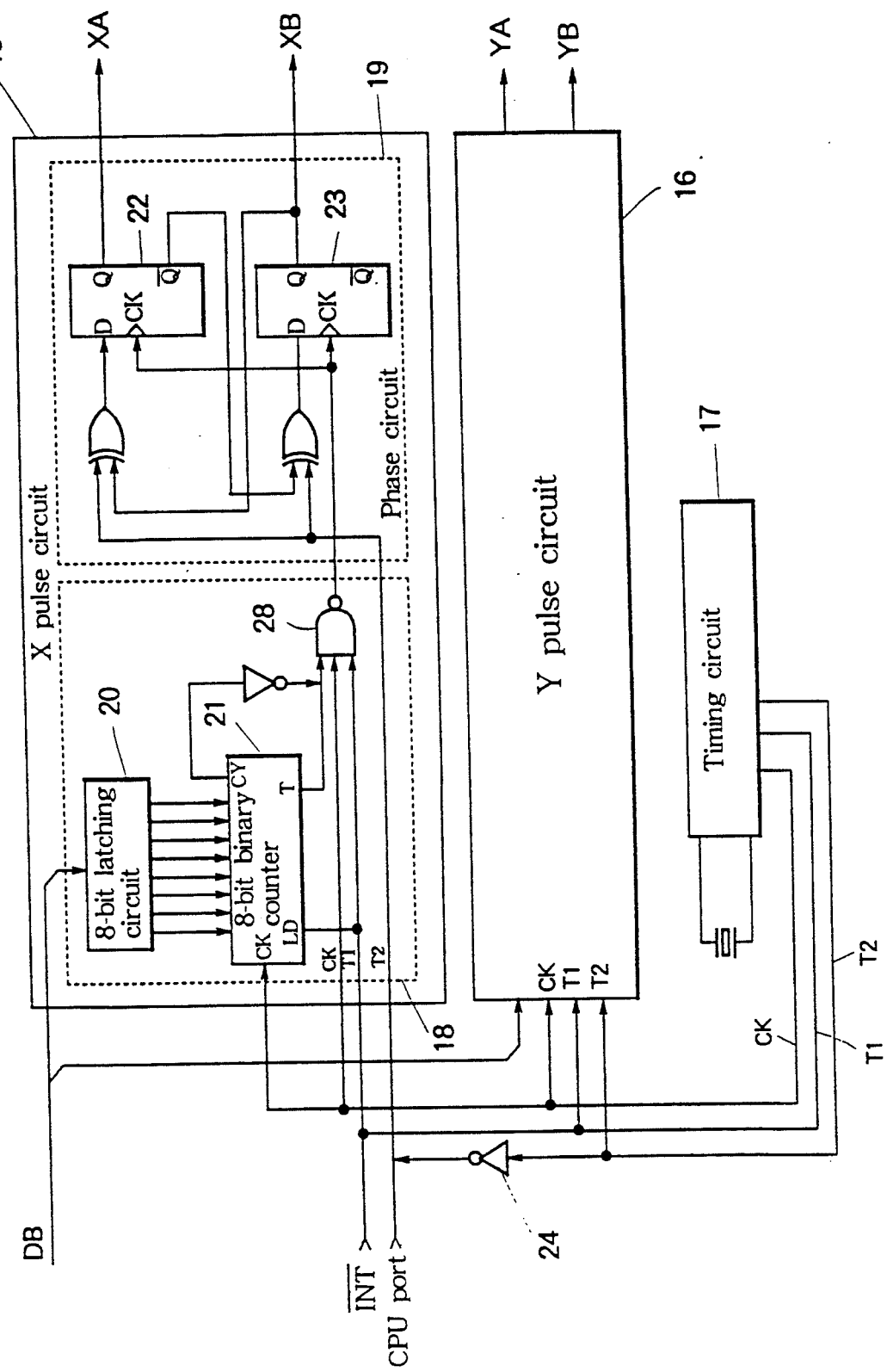
FIG. 5 is a detailed circuit diagram of a transmitter.

A detailed description is given infra for one embodiment of the inventive pulse count mode data communication system with reference to FIGS. 5–9. FIG. 5 is a structural diagram of hardware provided in the transmitter. This hardware includes X pulse circuit 15 and Y pulse circuit 16 (which correspond, respectively, to an X mouse counter and Y mouse counter in the receiver) and a timing circuit 17 for controlling pulse train transmission timing. The X and Y pulse circuits 15 and 16 have the same construction and derive X pulse trains (XA, XB) and Y pulse trains (YA, YB), respectively.

As shown in FIG. 5, the X pulse circuit 15 is comprised of a pulse train generating circuit 18 operative according to a numerical value represented by an 8-bit parallel data signal fed through a data bus DB to generate a corresponding primary pulse train, and a phase circuit 19 responsive to the primary pulse train to produce an X two-phase pulse train (XA, XB). The pulse train generating circuit 18 includes an 8-bit latching circuit 20 for successively latching data fed from the data bus DB, and an 8-bit binary counter 21 responsive to the latched 8-bit data to count (decode) the same to produce a signal CY for gating a clock pulse signal CK through a NAND circuit 28 during a given time interval determined by the received data value for counting the clock pulse signal CK according to the binary numerical value representing the latched data value. A definite number of the counted clock pulses is fed in the form of a primary or basic pulse train to the phase circuit 19 through a NAND circuit 28. The phase circuit 19 includes a pair of D-flip-flops 22, 23 operative according to a positive or negative sign of the latched data value held in the latching circuit 20 for producing X two-phase pulse train (XA, XB) having a relative leading or delaying phase condition.

Figure 6:
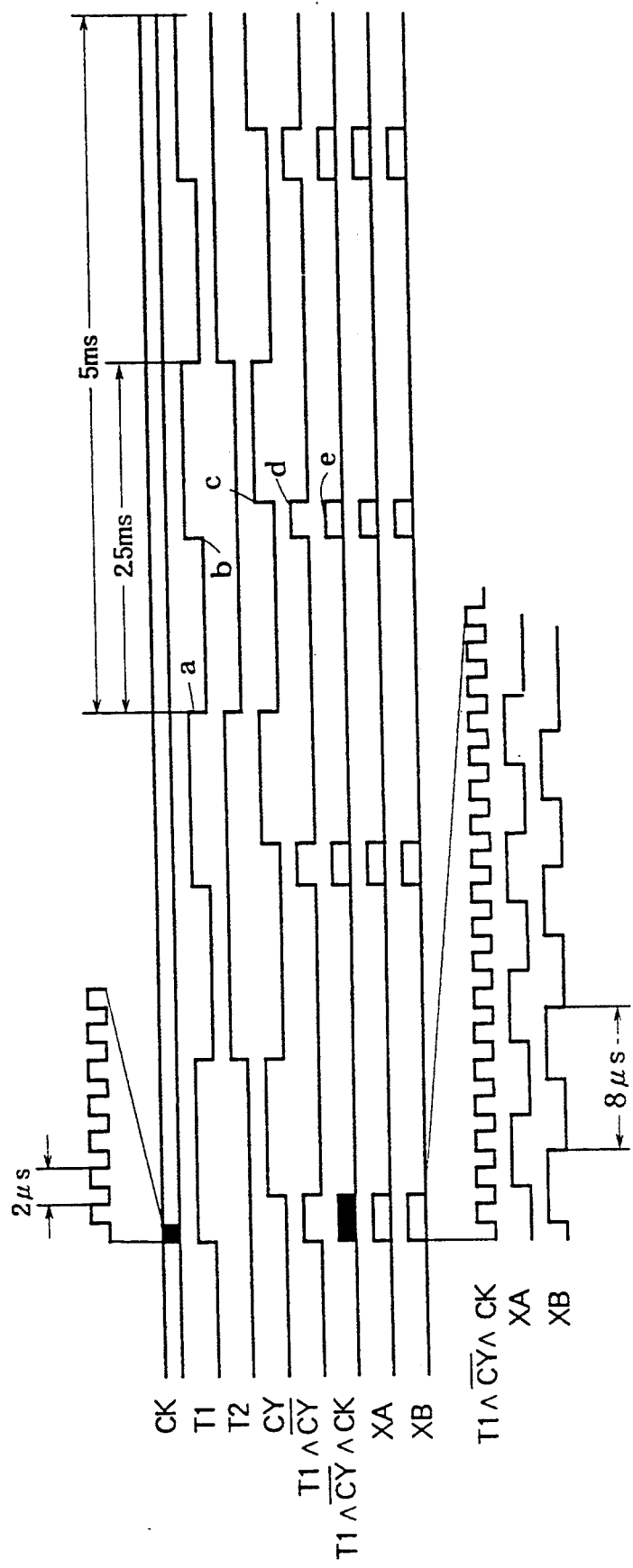
FIG. 6 is a timing chart illustrative of the transmission operation.

FIG. 6 is a timing chart illustrative of the operation of the FIG. 5 circuit. In this embodiment, the clock pulse signal CK has a 2 μs period between adjacent pulse edges contained in the two-phase pulse trains (XA, XB). Therefore, the two-phase pulse train including phase components XA and XB has a composite period of 8 μs. The timing of the two-phase pulse trains (XA, XB) is regulated by clock signals T1 and T2. The clock signal T2 determines the timing of a packet of four data values in one transaction processing, and is set to T2=5ms in this embodiment. In this case, the data transaction rate is accordingly set to 200 packet/sec.

A CPU of the transmitter is interrupted temporarily by an interrupt signal INT at a trailing edge a of the signal T1 so that the CPU checks through its CPU port a logic level of the other clock signal T2. When the signal T2 is at level L, a first data value is latched into the 8-bit latching circuit 20. On the other hand, when the signal T2 is at level H, a second data value is latched into the 8-bit latching circuit 20. Then, the latched data value is loaded into the 8-bit binary counter 21 to preset the same. The counter 21 starts at time b when the signal T1 turns to the H level to count the clock pulses CK until the counted number of the clock pulses reaches a certain integral value preset in the counter 21.

The counter 21 holds a signal CY at time c when the clock pulses have been counted. Operation of the phase circuit 19 is started by the clock pulse signal CK at a time d during the course of the operation of the 8-bit binary counter 21 to generate the X two-phase pulse trains (XA, XB). The other Y pulse circuit 16 has a similar structure as that of the X pulse circuit 15. However, the Y pulse circuit 16 is provided with an inverter 24 for inverting the phase condition of Y two-phase pulse train (YA, YB) relative to the corresponding X two-phase pulse train.

Figure 7:
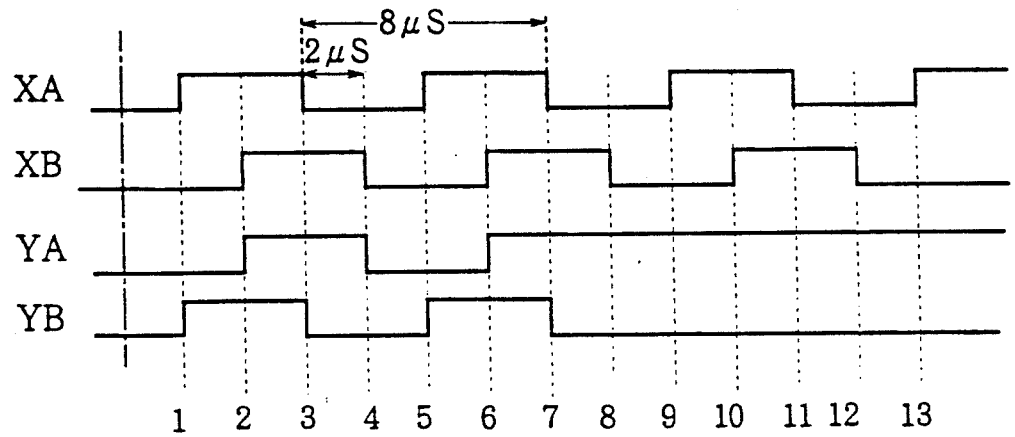
FIG. 7 is a waveform diagram of an X two-phase pulse train and a Y two-phase pulse train.

FIG. 7 includes a series of waveforms of the thus formed X two-phase pulse train and Y two-phase pulse train. In FIG. 7, the X pulse train corresponds to the integral value "1" of the given X data, and the Y pulse train corresponds to another integral value "−7" of the given Y data.

Figure 8:
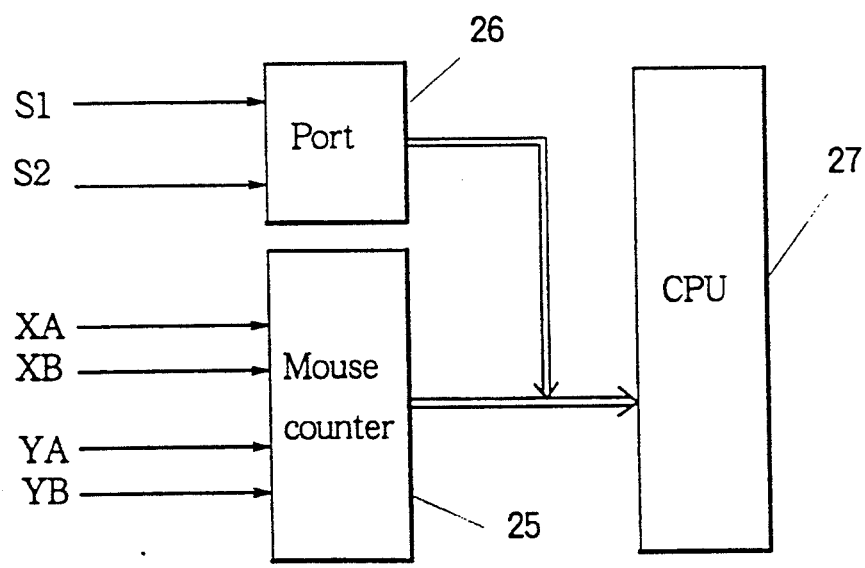
FIG. 8 is a block diagram of the receiver.

Next, FIG. 8 is a diagram of the receiver hardware construction. The receiver, such as a host computer, is provided with a mouse interface. The mouse interface includes a mouse counter 25 and a port 26. The mouse counter 25 includes an X counter for counting the X two-phase pulse trains (YA, YB) and a Y counter for counting the Y two-phase pulse trains (YA, YB). The port 26 normally responds to switching signals S1 and S2 of a type usually derived from a bus mouse. Since the bus mouse in accordance with the present invention does not derive switching signals of the usual type, port 26 is not used in the inventive communication system. However, it is possible to control the retrieval time of a transferred data value by using normal switching signals S1 and S2. Applicants have already disclosed such data communication system utilizing the port 26 in Japanese Patent Application No. 181438/1989. However, the port 26 is usually provided with a delay circuit for preventing chattering of the switching signals S1 and S2 to thereby hinder fast data transfer. The host computer of the receiver further includes a CPU 27 for retrieving a counted value of the mouse counter 25.

Figure 9:
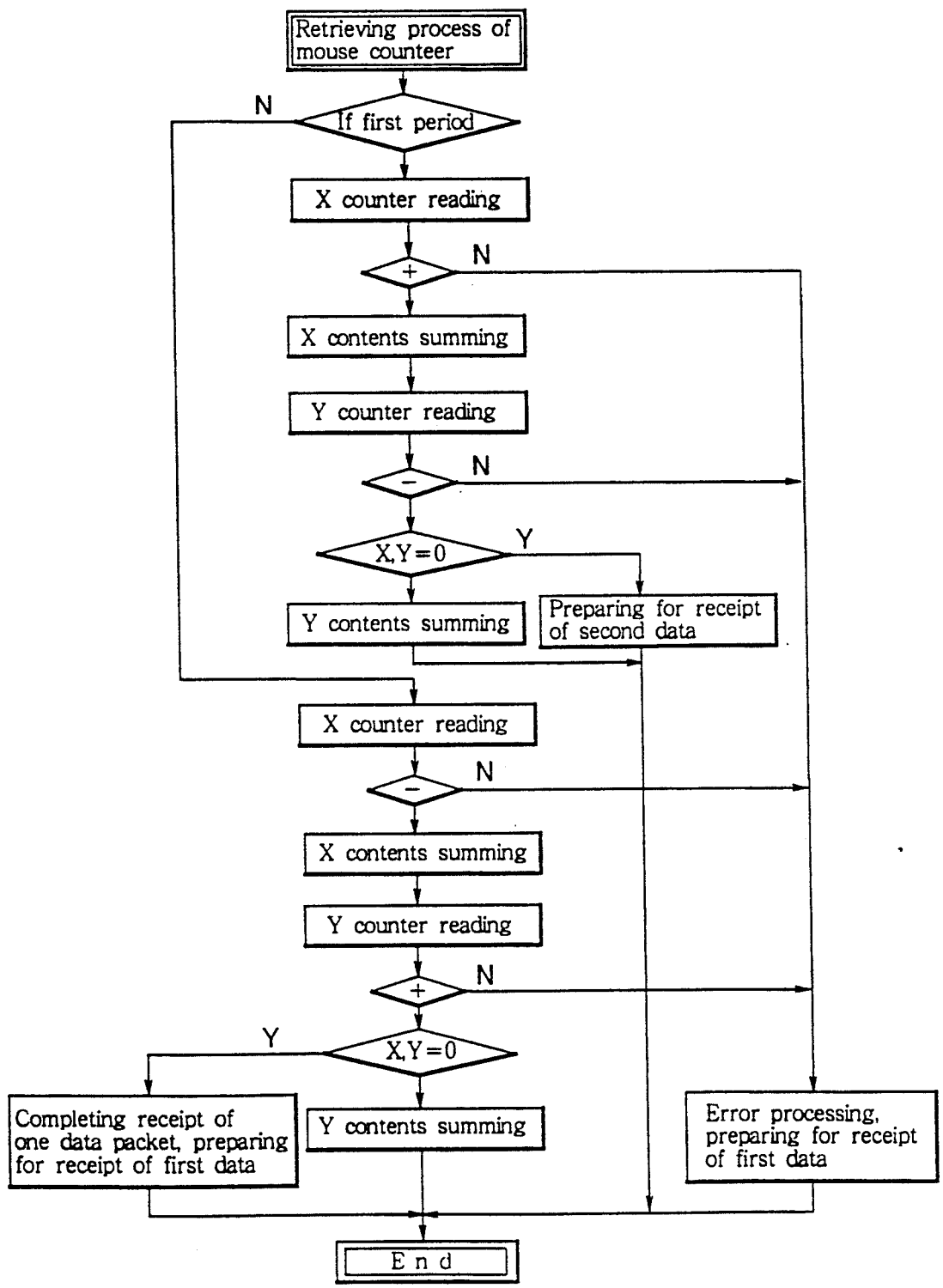
FIG. 9 is a flow chart of a receiver retrieving operation.
Figure 10:
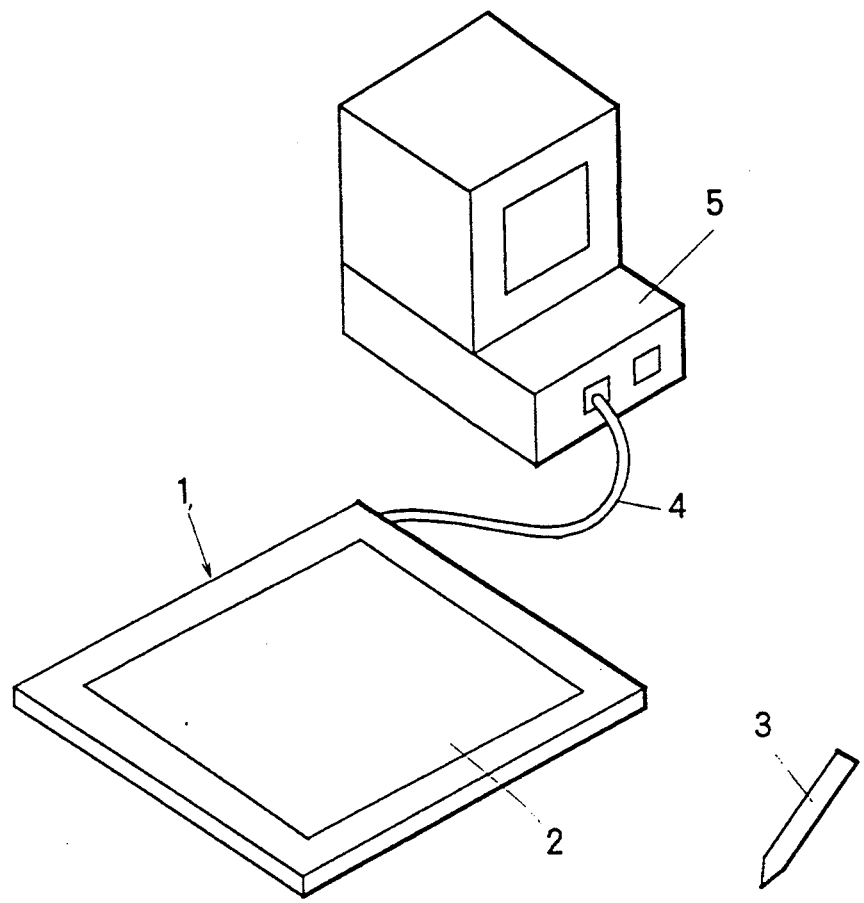
FIG. 10 is a schematic perspective view of the conventional communication system.
Figure 11:
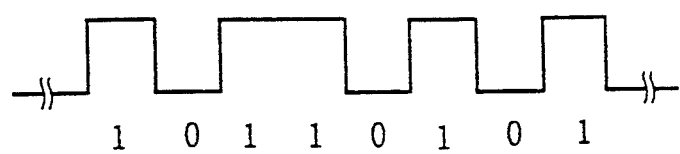
FIG. 11 is a waveform diagram of a transfer signal according to the conventional data transaction mode.
Figure 12:
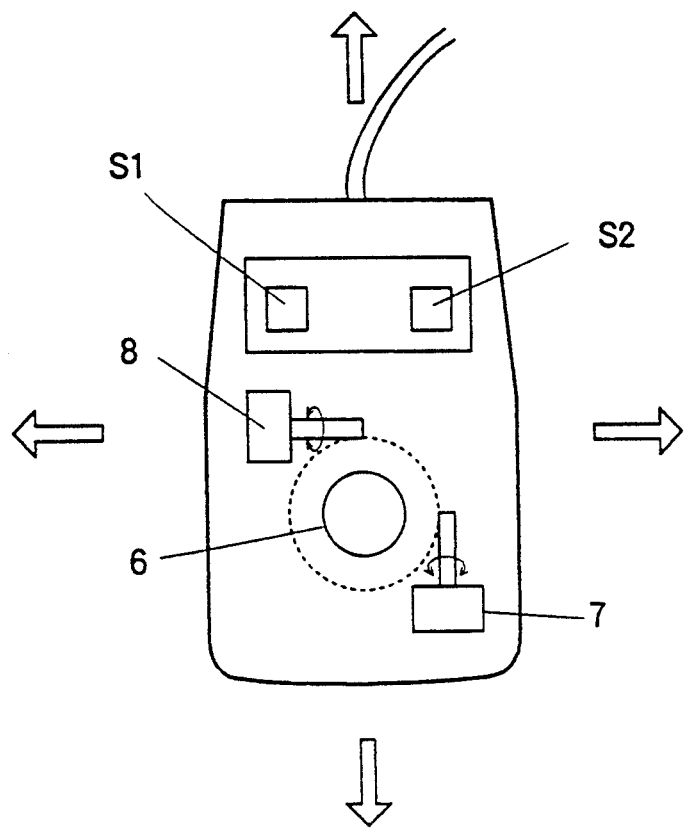
FIG. 12 is a schematic structural diagram of the typical bus mouse.

FIG. 9 is a flow chart of the retrieval process of the mouse counter, as conducted by the receiver host computer. In this embodiment, a set of four data values is transferred as one data packet in first and second periods. Namely, the first pair of X and Y data values and the second pair of X and Y data values are sequentially supplied to the host computer as one complete data packet. When the first data pair is admitted, the CPU 27 reads out the X counter. If the X data value is positive, the CPU 27 sums the fragmentally counted contents of the X counter until the last count turns to null. On the other hand, if the X data value is negative, the computer jumps to error processing. The CPU 27 also reads out intermittently the content of the Y counter. If the Y data value is negative, the CPU 27 sums the intermittently retrieved contents of the Y counter until the Y counter turns to zero. On the other hand, if the Y data value is positive, the computer jumps to error processing. When both of the X counter content and the Y counter content are finally nulled, the CPU 27 determines that the first data transfer has been completed and proceeds to a receiving process of the second data pair.

When the second data pair is admitted, the X counter is intermittently read out. If the X data value is negative, the sum of the contents is carried out until the last counter value is zero. Otherwise, if the X data value is positive, the computer jumps to error processing. The Y counter is also checked intermittently. If the Y data value is positive, the sum of the Y counter value is carried out until the last counter value is zero. Otherwise, if the Y data value is negative, the computer jumps to error processing. When the X counter content and Y counter content both turn to zero, a judgement is made that the transmitter has finished transferring the second data pair, thereby confirming completeness of the transferred packet of four data values. Then, the retrieval processing returns to an initial admission step for the next first data pair.

Next, the description is given for the data transaction rate of the inventive pulse count mode communication system for the case of a packet of four data values transferred during processing of one transaction. The transaction rate is determined according to the transmitter pulse train frequency and retrieval frequency of the mouse counter in the receiver. If the receiver has an internal timer to set an internal time interval of 2 ms, one packet of four data values can be transferred during a transaction period of $5 \times 2 = 10$ ms. Thus, the transaction rate is 100 packets/sec. The shorter the period of the pulse train outputted from the transmitter and the shorter the sample timing of the mouse counter in the receiver, the faster the transaction rate. Preferably, either the period of the pulse train or the sampling interval may be variably set to realize a desired transaction rate. The following TABLE 2 shows the relation between the receiver internal timer rate and the transaction rate.

TABLE 2

| Data transaction rate (pps) | Transfer period (ms) Transmitter | Retrieving interval (ms) Receiver |
|---|---|---|
| 100 | 5 | 2 |
| 200 | 2.5 | 1 |

Lastly, a description is given below for an example of a data packet format transferred according to the inventive data communication system. It is assumed that an exemplary digital data packet indicative of a coordinate point inputted by a digitizer is transferred to a host computer. The digital data packet is comprised of two or more of bytes, depending on the digitizer size. For example, in the following TABLE 3 are shown bit and byte formats of a digital data packet comprised of first through fourth bytes each containing eight parallel bits.

TABLE 3

| | 7 | 6 | 5 | 4 | 3 | 2 | 1 | 0 |
|---|---|---|---|---|---|---|---|---|
| 1 | — | RDY | S 5 | S 4 | S 3 | S 2 | S 1 | S 0 |
| 2 | — | Y 9 | Y 8 | Y 7 | X 10 | X 9 | X 8 | X 7 |
| 3 | — | X 6 | X 5 | X 4 | X 3 | X 2 | X 1 | X 0 |
| 4 | — | Y 6 | Y 5 | Y 4 | Y 3 | Y 2 | Y 1 | Y 0 |

In the TABLE 3, the left column numerals 1-4 denote the first through fourth bytes, respectively, and the top row numerals 7-0 denote an eight-bit arrangement in each of the bytes. In this example, the most significant bit position is vacant in each byte. Accordingly, the information of one coordinate point is represented by a multiple bit arrangement of $4 \times 7 = 28$. This 28-bit arrangement is divided into the first through fourth bytes. The bits XO through X10 denote an X coordinate value having integral values of 0 through 2047. The bits Y0 through Y9 denote a Y coordinate value having integral values of 0 through 1023. Further, the bits S0 through S5 represent a switching signal related to a kind of input tool used to designate a coordinate point and to gradation information of the designated point. The bit RDY indicates whether a coordinate designating tool exists within an effective area of the planar sensor.

In the above described embodiment, the coordinate data value inputted from the digitizer is transferred to the host computer. Generally, the inventive pulse count mode communication system can be applied to data transfer between various types of input terminal devices and measurement devices, and the host computer. Therefore, the technical scope of the present invention is not limited to data transfer from the digitizer.

Figure 15:
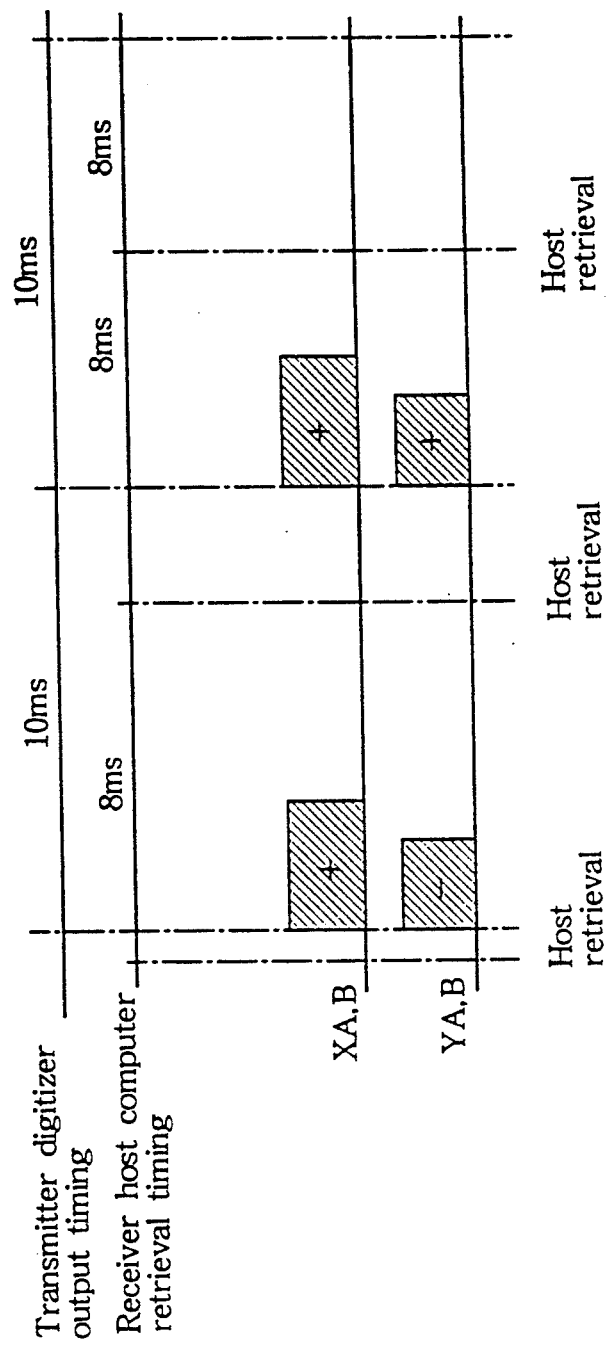
FIG. 15 is a transfer timing chart for a relative coordinate data value.

In the above described embodiment, the digitizer absolute coordinate data value is transferred by means of the inventive pulse count mode communication system. However, the present invention is not limited to this embodiment, but the invention may be applied to transaction involving a relative coordinate data in similar manner. The description of FIG. 15 is given for processing the displacement of a coordinate designating tool, with data transfer from the digitizer to the host computer by means of the aforementioned hardware construction by using a two-phase pulse train. In the present embodiment, the transmitter transmits a pair of relative X and Y coordinate data value every given transfer period having an interval of, for example, 10 ms, while the receiver retrieves the pair of X and Y data values every given retrieval period having another interval of, for example, 8 ms, which is smaller than the transfer interval. Any receiving misoperation, such as overflow of the mouse counter, can be avoided by such settings of communication timings.

Figure 13:
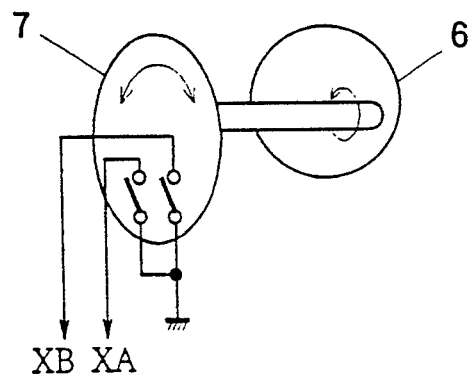
FIG. 13 is an illustrative diagram for the operation of a bus mouse sensor.

Aside from the above, a bus mouse device produces a two-phase pulse train as shown in FIG. 14. In detail, as illustrated in FIG. 13, the bus mouse device generates two-phase pulse trains having a variable pulse width determined according to the rotation speed of a sensor coupled to a rotary shaft. Therefore, the pulse width varies as the bus mouse moves. The pulse train is not interrupted as long as the bus mouse is moving. On the other hand, according to the present invention, the receiver, i.e., the host computer, is provided with a mouse counter responsive only to count pulse edges without regard to the fact that the pulse train is continuous or interrupted, or the pulse width varies or is constant, until the CPU retries the counted value of the mouse counter. Therefore, it is not necessary to form two-phase pulse trains that are transferred by the inventive system identically to those produced by the typical bus mouse. Accordingly, the pulse circuit provided in the transmitter of the inventive system can be utilized for transferring a relative displacement data value from the digitizer such that the two-phase pulse trains are intermittently outputted every transfer period of 10 ms as shown in FIG. 15. In turn, the host computer effects the retrieval every 8 ms period to avoid overflow of the mouse counter. By such a timing relation, the relative displacement data value can be transferred from a coordinate input device, such as a digitizer, to the host computer.

In practical use of the digitizer, it is desired to selectively transfer to the host computer either the absolute coordinate data value or the relative coordinate data value or the relative displacement data value. Thus, there is described infra a modified communication system effective to select either the absolute coordinate data value or the relative coordinate data value so as to transfer the selected data value to the bus mouse interface provided in the host computer by means of common hardware.

Figure 16:
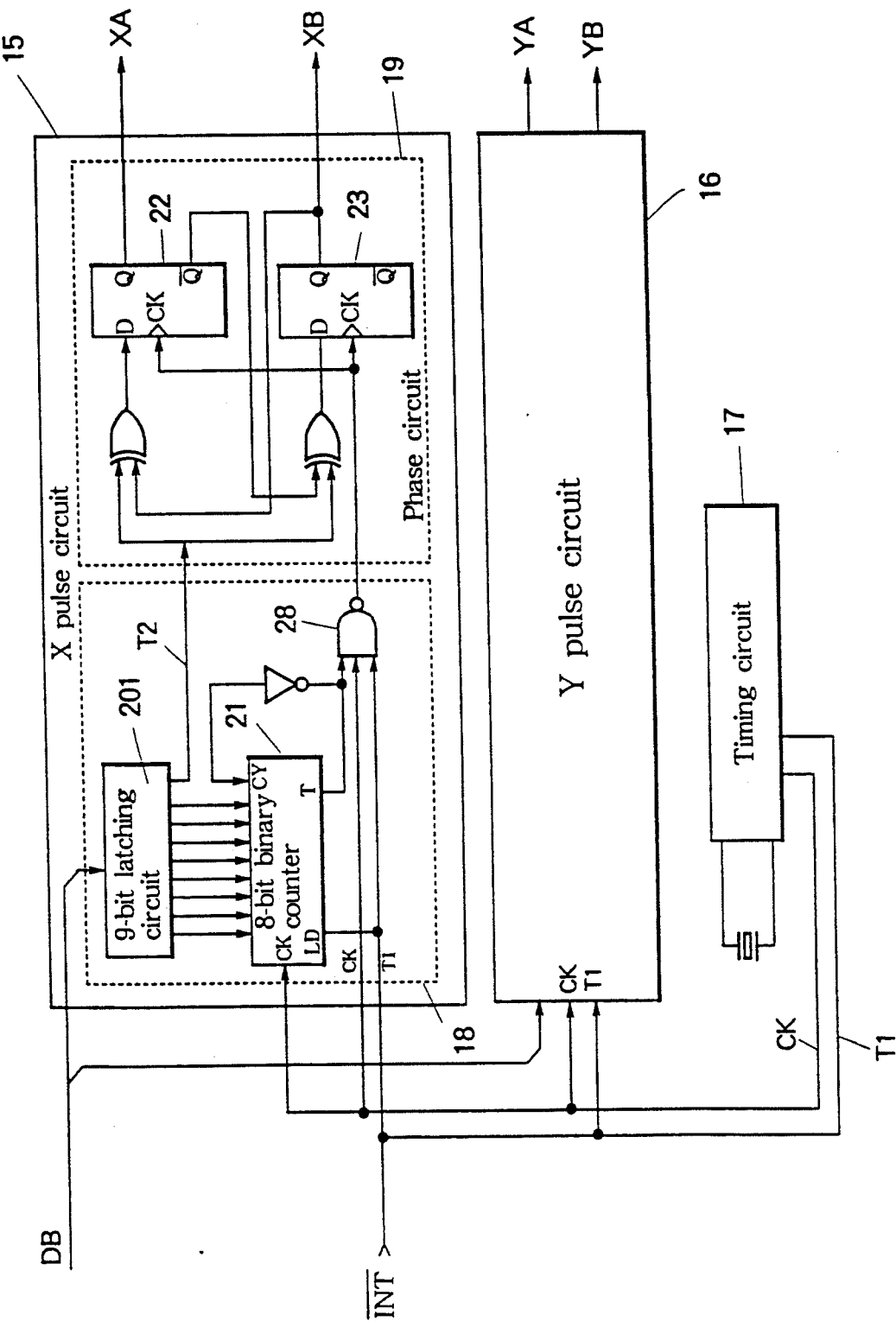
FIG. 16 is a detailed circuit diagram of another embodiment of the transmitter.

FIG. 16 is a hardware construction diagram of a transmitter operative to switch between the absolute coordinate data value and the relative coordinate data value to be transferred. This hardware is comprised of X pulse circuit 15 and Y pulse circuit 16 corresponding, respectively, to an X counter and a Y counter provided in the receiver, and a timing circuit 17 for deriving a pulse train. The X pulse circuit 15 and Y pulse circuit 16 have the same construction for outputting X two-phase pulse trains (XA, XB) and Y two-phase pulse trains (YA, YB).

As shown in FIG. 16, the X pulse circuit 15 is comprised of a pulse generating circuit 18 operatively based on an 8-bit coordinate data value and 1-bit code fed from a 16-bit data bus DB connected to a CPU (not shown) of the digitizer for generating a primary pulse train representing a numerical value indicative of the fed data value, and a phase circuit 19 responsive to the primary pulse train to generate X two-phase pulse trains (XA and XB). The pulse generating circuit 18 is comprised of a 9-bit latching circuit 201 for sequentially latching a data value from the data bus DB, and an 8-bit binary counter 21 operative according to an integral value determined by the binary representation of the eight least significant eight bits of the latched 9-bit data value in the latching circuit 20 for counting a clock pulse signal CK. Accordingly, the primary pulse train containing the counted number of clock pulses is fed to the phase circuit 19 through a NAND circuit 28. The phase circuit 19 is provided with a pair of D-flip-flops 22, 23 responsive to a plus or minus code indicated by the most significant bit T2 of the latched 9-bit parallel data value for producing two-phase pulse trains (XA, XB) having relative advancing (leading) or delaying (lagging) phase conditions and representative of the least significant eight bits.

Figure 17:
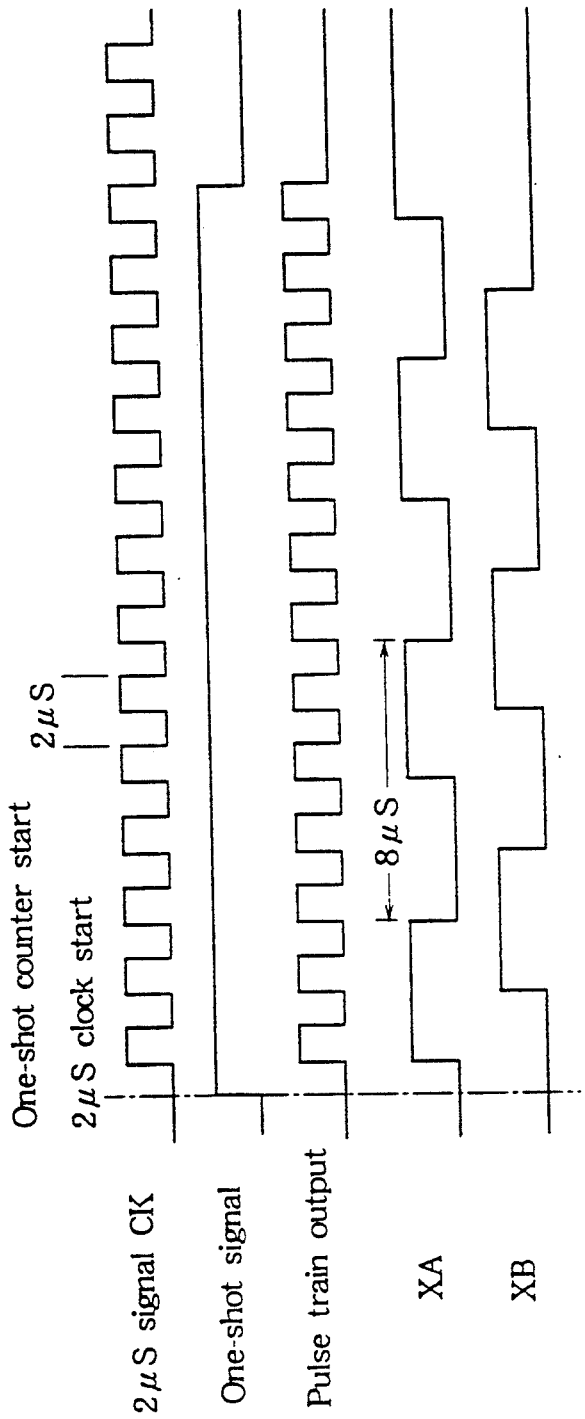
FIG. 17 is a timing chart for the operation of a further embodiment of the transmitter.

The pulse generating circuit 18 of the transmitter shown in FIG. 16 includes multiple hardware components. However, the present invention is not limited to such construction; e.g. a one chip CPU can be used to form a counter for generating a pulse train. FIG. 17 is a timing chart illustrative of the operation of such pulse generating means. As shown in the figure, the pulse generating means is comprised of a one-shot counter operative to provide a one-shot pulse having a duration determined according to the coordinate data value to be transferred. During the one-shot pulse, a clock pulse signal CK having a period of 2 μs passes through a gate circuit to the phase circuit. The phase circuit outputs two-phase pulse train (XA, XB) having a definite number of pulse edges corresponding to the number of the inputted clock pulses. Such construction simplifies the transmitter circuit structure.

Figure 18:
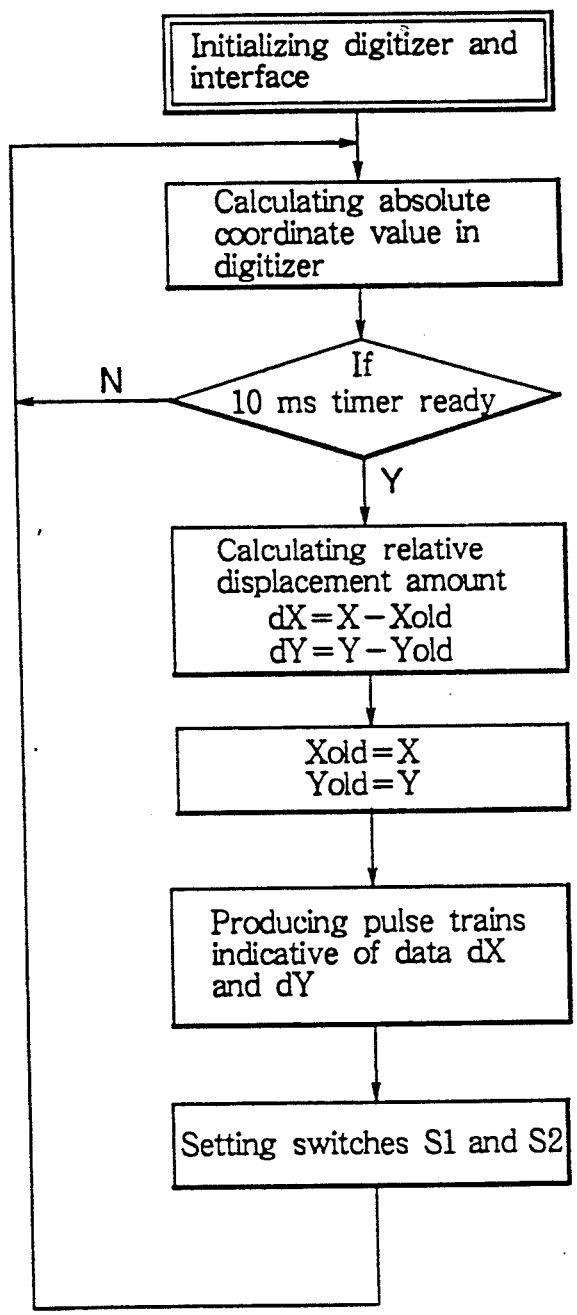
FIG. 18 is a flow chart of the displacement data transmission process in the transmitter.

Lastly, referring to FIG. 18, the description is given for the transfer of relative displacement data values. When the digitizer CPU selects the transfer of a relative displacement data value, the pulse circuit of FIG. 16 operates according to the predetermined algorithm to generate a pair of two-phase pulse trains indicative of the relative displacement data value in a manner similar to a typical bus mouse device.

With regard to the transfer of the absolute coordinate data, the CPU of the digitizer is temporarily interrupted in response to a trailing edge of the signal T1 so that the CPU writes the data value into the pulse circuit. However with regard to the transfer of the relative coordinate data value, the data value is loaded into the pulse circuit in response to a clock of an internal timer in the digitizer. Namely, as shown in FIG. 18, firstly the digitizer and the bus mouse interface are initialized to switch the digitizer operation program to the relative coordinate data transfer mode. Next, a pair of relative displacements dX and dY are calculated every given 10 ms period, based on the detection results of successive absolute coordinate points in the digitizer, and the calculated data pair of dX and dY are loaded into the respective X and Y pulse generating circuits. As opposed to the transfer of the absolute coordinate data value, the pair of relative displacement data values dX and dY in a range of $+127$ through $-128$ are concurrently written into the pair of X and Y pulse generating circuits, respectively, without employing a specific procedure. If the relative displacement data value is positive, the most significant bit is set to L level in the 9-bit latching circuit 201 shown in FIG. 16 and the eight lower order bits have values determined by the value of the relative displacement dX or dY. Otherwise if the relative displacement data value is negative, the most significant bit is set to H level in the 9-bit latching circuit 201 and the eight lower order bits have values representing the relative displacement dX or dY. Although the switching signals S1 and S2 related to a bus mouse device are not used in the absolute coordinate data transfer, in the relative coordinate data transfer the switching signals S1 and S2 are outputted to designate a switch condition of the coordinate input tool so as to enable the same to simulate a typical bus mouse device. By using this two-phase pulse generating circuit, the CPU of the digitizer can be efficiently operated to simply set up a relative displacement data value at a desired time interval. The transmitted data value is retrieved each retrieval interval of, for example, 8 ms, which is selected to be shorter than the transfer period of, for example, 10 ms.

INDUSTRIAL APPLICABILITY

As described above, the inventive pulse count mode communication system can be applied to transfer a coordinate data value inputted by a coordinate input device, such as a digitizer, to a host computer in which the transferred data is to be processed. Further, the inventive system can be generally applied to a parallel bit data transfer between a host computer and various types of peripheral input terminal devices and measurement devices.

We claim:

1. A communication system for transferring parallel binary data bits from a transmitter to a receiver, the transmitting comprising: a pulse circuit operative each given transfer period for outputting a two-phase pulse train including a certain number of pulse edges corresponding to an integral number represented by binary parallel bits constituting the data to be transferred; the receiver comprising: a resettable counting circuit for counting pulse edges contained in the transferred two-phase pulse train, and a retrieving circuit operative intermittently every given retrieving interval within one transfer period for retrieving sequentially each counted content from the counting circuit and repeatedly resetting the content of the counting circuit, and being operative when a last counted content turns to a preset value for summing up all of the sequentially retrieved counted contents to thereby determine a received number of the pulse edges representative of the transferred data.

2. A communication system according to claim 1, wherein the transmitter includes a coding circuit for applying to a sequence of plural data either of a plus code and a minus code effective to discriminate the plural data from each other, and the pulse circuit operates to switch a phase condition of the two-phase pulse train according to the code applied to the corresponding data, and wherein the receiver operates to discriminate from each other the time-sequentially transferred plural data according to the phase condition of each two-phase pulse train.

3. A communication system according to claim 2, wherein the coding circuit operates to apply the plus code and the minus code alternately to the sequence of the plural data.

4. A communication system according to claim 2, wherein the coding circuit operates to apply one code to a top data in the sequence and to apply the other code to subsequent data in the sequence.

5. A communication system according to claim 1, wherein the transmitter includes a pair of pulse circuits for concurrently transmitting a pair of data, and the receiver includes a corresponding pair of counting circuits for concurrently receiving a pair of data.

6. A communication system according to claim 5, wherein the pair of pulse circuits operate to transmit a pair of data in a first transfer period and to transmit another pair of data in a second transfer period to thereby effect transaction of one data packet containing four data.

7. A communication system according to claim 1, wherein the counting circuit and the retrieving circuit together constitute a bus mouse interface in the receiver.

8. A communication system according to claim 1, wherein the transmitter includes a coordinate input device operative to designate a coordinate data to be transferred.

9. A communication system according to claim 1, wherein the transmitter includes a coordinate input device operative to selectively produce an absolute coordinate data value and a relative coordinate data value, and selecting means for at different times selecting the absolute coordinate data value and the relative coordinate data value to be transferred.

10. A communication system according to claim 9, wherein the retrieving circuit of the receiver operates each given retrieving period set no greater than the transfer period for detecting a selected relative coordinate data transferred from the transmitter every transfer period.

11. A communication system according to claim 9, wherein the transmitter operates to calculate the relative coordinate data value based on the absolute coordinate data value directly obtained by the coordinate input device, and wherein the coding circuit operates to selectively apply a plus code and a minus code to the calculated relative coordinate data value and the pulse circuit operates according to the coded relative coordinate data value for producing a two-phase pulse train having a certain phase condition according to the applied code so as to simulate a typical bus mouse device.

12. A receiver responsive to parallel binary data bits transmitted from a transmitter during a given transfer period as a two-phase pulse train including a certain number of pulses corresponding to an integral number represented by binary parallel bits constituting a transmitted data value; the receiver comprising: a resettable counting circuit for counting pulses contained in the two-phase pulse train as received at the receiver, and a retrieving circuit operative intermittently every given retrieving interval within one transfer period for retrieving sequentially each counted content from the counting circuit and repeatedly resetting the content of the counting circuit, and being operative when a counted content turns to a predetermined value for summing up all of the sequentially retrieved counted contents to thereby determine a received number of the pulse edges representative of the transmitted data value.

13. The receiver of claim 12 wherein the counting circuit and the retrieving circuit together constitute a bus mouse interface.

14. The receiver of claim 12 wherein the transmitted data bits during a first period represent absolute coordinate data value and during a second period represent a relative coordinate data value, the retrieving circuit operating during each given retrieving period no greater than the transfer period for detecting the absolute coordinate data value transmitted during the transfer period.

15. A transmitter responsive to a signal representing a sequence of plural data values comprising a pulse circuit operative during each of plural transmitting periods for deriving a two-phase pulse train including a certain number of pulse edges corresponding to an integral number represented by binary parallel bits constituting data to be transmitted, a coding circuit coupled with the pulse circuit for selectively applying to signal representing the sequence of plural data values a plus code and a minus code that effectively discriminates the plural data values from each other, the pulse circuit operating to switch a phase condition of the two-phase pulse train according to the code selectively applied to the sequence of plural data values.

16. The transmitter of claim 15 wherein the coding circuit operates to apply the plus code and the minus code alternately to the sequence of the plural data values.

17. The transmitter of claim 15 wherein the coding circuit operates to apply one code to a first data value in the sequence and to apply the other code to subsequent data value in the sequence.

18. The transmitter of claim 15 wherein a pair of said pulse circuits are included for concurrently transmitting a pair of data values, the pair of pulse circuits operating to transmit a pair of data values in a first transfer period and to transmit another pair of data values in a second transfer period to thereby effect transaction of one data packet containing four data values.

19. The transmitter of claim 15 further including a coordinate input device operative to designate a coordinate data value to be transmitted.

20. The transmitter of claim 15 further including a coordinate input device operative to selectively produce an absolute coordinate data value and a relative coordinate data value, and selecting means coupled with the coordinate input device and the coding circuit for at different times selecting the absolute coordinate data value and the relative coordinate data value to be transmitted.

21. The transmitter of claim 15 wherein the transmitter operates to calculate a relative coordinate data value based on absolute coordinate data value directly obtained by a coordinate input device, and wherein the coding circuit operates to selectively apply either a plus code or a minus code to the calculated relative coordinate data value and the pulse circuit operates according to the coded relative coordinate data value for producing a two-phase pulse train having a certain phase condition according to the applied code so as to simulate a typical bus mouse device.

* * * * *